Patented Dec. 5, 1950

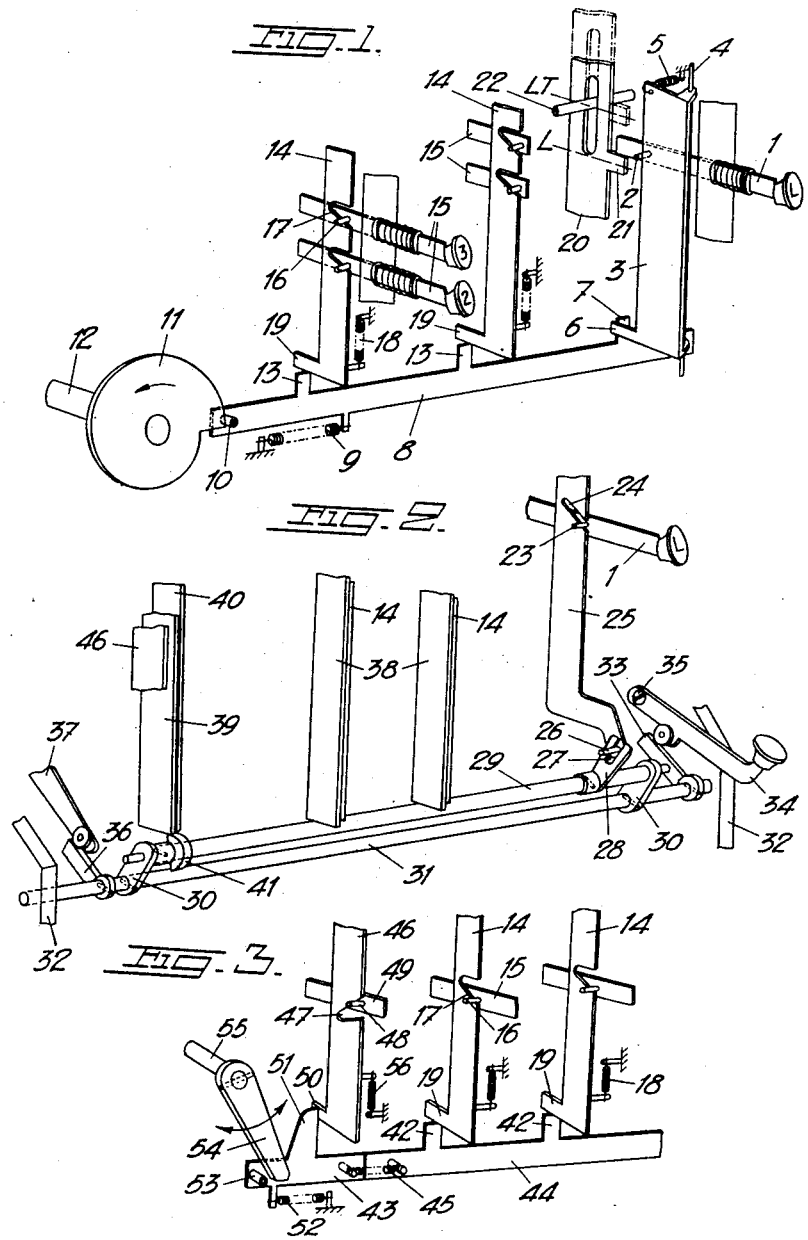

2,533,075

UNITED STATES PATENT OFFICE 2,533,075

CASH REGISTER, ACCOUNTING MACHINE, AND THE LIKE

Sture Edvard Werner, Stockholm, Sweden, assignor to L. M. Ericssons Kassaregister Aktiebolag, Stockholm, Sweden Application December 5, 1944, Serial No. 566,668
In Sweden December 13, 1943

9 Claims. (Cl. 235—7)

1

This invention relates to cash registers, accounting machines and similar machines in which amongst other operations total taking or related items, generally termed kind-of-operation items, is to be effected. Hitherto, in order to permit such total taking two different principles of construction have been adopted.

According to one principle the kind-of-operation items are only set up on a separate kind-of-operation totalizer, whereupon in effecting the kind-of-operation total taking the amount thus accumulated in the kind-of-operation totalizer is transferred to the respective clerk's totalizer and the amount totalizer. Operation on this principle, however, suffers from the drawback that the kind-of-operation items are not specified in the clerks' and amount totalizers. Furthermore, in order that an amount left by a clerk in the kind-of-operation totalizer shall not be unjustly charged to the account of another clerk afterwards going to register a usual item on his totalizer, additional locking means of complicated structure must be provided in the machine.

The said risk of unfair or otherwise false operations is eliminated by operating on the other principle, according to which each individual item must be introduced by the respective clerk in his totalizer as well as in the transaction amount totalizer during the operation. In this case, in taking the total of the items, the total amount is, of course, not transferred to the clerks' and transaction totalizers. Nevertheless, the setting up of the items is a very complicated and troublesome operation, inasmuch as each item requires depression both of the clerk's key and the transaction key. Especially in case of bonding machines for several kinds of goods this means a considerable drawback.

According to both principles two keys, viz. one kind-of-operation key and one kind-of-operation total taking key, must be used in performing the operations.

The present invention has for an object to overcome the above stated inconveniences and render the operation of the cash register or the accounting machine, as the case may be, more simple with a view to securing both a higher degree of accuracy and a more rapid and ready operation.

Another object of the invention is to render the structure of the machine more simple in spite of its increased efficiency. In case of cash registers the special advantage is gained that the kind-of-operation total taking key may be dispensed with.

2

Another object of the invention is to simplify the setting up of the kind-of-operation items in cash registers so that a complete record of the said items may be obtained, for instance, in the clerks' totalizers, without requiring depression of the respective clerk's key more than one time within respect to all kind-of-operation items.

Still another object of the invention is to effect locking in a simple way of the keys in the normal position of the machine in order to avoid mistakes.

One embodiment of the invention is illustrated in the accompanying drawings.

Fig. 1 is a perspective view of certain details of the amount and kind-of-operation key banks of a cash register to which the invention is applied.

Fig. 2 is a perspective view of certain other details of said key banks with associated correcting means.

Fig. 3 is a perspective view of retaining means for locking slides of the key banks.

The machine shown is of the general type shown in U. S. Patent No. 2,309,901 and French Patent No. 852,846, but the invention may also be applied to other types of machines.

With reference to the drawing, the numeral 1 designates a kind of operation key, but the machine has no kind-of-operation total taking key. The rod of key 1 carries a laterally projecting pin 2, normally bearing with its end against a flap or wing 3, mounted to rock on a shaft 4 and which is tensioned by a tension spring 5 acting to draw the free edge of the flap towards the key 1. When key 1 is depressed, the flap 3 swings around with its free edge in front of the pin 2, thereby locking the kind of operation key in its depressed position. The flap 3 carries at its lower end a projection 6 extending into the path of a projection 7 on a slidably mounted rail 8 acted on by a tension spring 9, by means of which a pin or roller 10 on the rail is caused to bear against the periphery of a cam 11 on shaft 12, which may be the power shaft of the machine or an intermediate shaft in operative relation with the power shaft of the machine.

Said rail 8 is also provided with a set of projections 13, viz. one for each amount key bank. (For the sake of simplicity two amount key banks only are indicated in the drawing.) Each amount key bank is provided in usual way with (at least) one key locking bar 14 cooperating in well-known way with the amount keys 15 which bar is, consequently, depressed each time an amount key is depressed. To this end the amount keys are provided in usual way with pins 16 cooperating with inclined surfaces 17 of the locking bars 14. Tension springs 18 act to restore the locking bars 14 at the end of each cycle of operation of the machine. The locking bars 14 are formed with projections 19 at their lower ends adapted to cooperate with the projections 13 of rail 8.

At the kind-of-operation key bank a kind-of-operation selecting rack 20 is provided which in the operation of the machine strikes the kind of operation key 1 by means of its projection 21 when said key is depressed. In such case the rack is, consequently, stopped in its kind of operation position L. Let it be assumed, on the contrary, that the kind of operation key is not depressed (nor any other kind-of-operation key) when the selecting rack 20 will in the operation of the machine automatically move to its kind-of-operation total taking position LT where it will be checked by a fixed stop represented, for instance, by the guide rod 22.

As shown in Fig. 2, the kind of operation key also carries a laterally projecting pin 23 engaging an inclined slot 24 formed in a longitudinally reciprocable bar 25. A pin 26 carried by the lower end of said bar engages a slot 27 formed in a fork-shaped lever 28 fastened to a shaft 29. Said shaft 29 is rotatably but not slidably mounted at both of its ends in arms 30 rigidly secured to a shaft 31 parallel with shaft 29 which is rotatably but not slidably mounted in the machine frame 32.

Rigidly secured to said shaft 31 is a lever 33 engaged by a manually operable correction key 34 pivoted at 35. The depression of said correction key 34 turns arm 33 and thus also shaft 31 and shaft 29 carried thereby, causing the latter to perform a circular movement about shaft 31 as an axis of rotation. Shaft 29 may also perform the same circular movement under the control of a lever 37 acting on a lever 36 secured to shaft 31. Said lever 37 may be operated in well-known way in the course of each cycle of operation of the machine to reset those bars of the key banks which have been set. In other words, the lever 37 effects what may be called the power controlled correction.

Situated in the path of the circular movement performed by the shaft 29 are bars 38 belonging to the amount key banks, serving, for instance, to retain the keys in depressed state. Similar bars 39, 40 are also provided in the clerks' and transaction key bank. Said bars 39, 40 are slightly shorter than bars 38 and may be engaged by a semi-cylindrical or crescent cam 41 on shaft 29.

As shown in Fig. 3 the locking bars 14 belonging to the amount key banks cooperate with a rail 43, 44 by means of their own projections 19 and projections 42 of said rail. Rail 43, 44 comprises, as shown in Fig. 3, two members 43 and 44 held together by means of a tension spring 45.

A locking bar 46 belonging to the clerks' and/or transaction key bank is formed with inclined surfaces 47 to be engaged by a pin 48 on the clerks' and transaction keys 49. Said locking bar 46 carries at its lower end a projection 50 in front of a projection 51 of the rail member 43. Said last mentioned rail member is acted on by a tension spring 52 and carries a pin 53 projecting into the path of swinging lever 54 carried by shaft 55. Said swinging lever 54 may be identical with or connected to the swinging lever 37 of Fig. 2.

The locking bar 46 is pulled downwards by the action of a resetting spring 56.

The mechanisms above described operate as follows:

Fig. 1 shows the respective elements in the normal position of the machine after a kind of operation key, but no amount key has been depressed. On the depression of the kind of operations key the flap 3 falls into the path of pin 2 in order to retain the key in its depressed state. If no further key (of the amount key banks) be depressed, the projections 13 of rail 8 will be free of the projections 19 of bars 14, so that when, during the rotation of cam 11 in the operation of the machine, the apex of cam 11 leaves pin 10, spring 9 is allowed to pull rail 8 to the left. By means of its projection 7 rail 8, while thus displaced to the left in Fig. 1, carries the projection 6 with it, thereby causing the flap 3 to turn on its pivot and release pin 2. The kind of operation key 1 is now allowed to return to its normal position by the action of its spring. When in the continued operation of the machine the selector rack 20 of the kind-of-operation bank starts moving upwards it will, thus, not be stopped by the key 1 but may continue its movement until its is stopped by the guide rod 22 in the kind of operation total taking position LT. It is thus seen that, if the kind of operation key 1 but no amount key 15 be depressed, the machine while performing its cycle of operation will automatically effect a total taking. If, on the contrary, an item has been set up on the amount key banks, while the kind of operations key 1 is depressed, this will result in a depression of a locking bar or bars 14 by the action of the amount key or keys 15 depressed. Each such depressed locking bar 14 enters by its projection 19 into the path of the respective projection 13 of rail 8, that is to say, the projection 19 is lowered into a position immediately to the left of the respective projection 13. As soon as, in the continued operation of the machine, the apex of cam 11 passes beyond pin 10, the spring 9, while still acting on the rail 8, is prevented from displacing it to the left in Fig. 1 because of the fact that one or more of the projections 19 is or are standing in the way of their respective projection or projections 13.

Summarising: with the kind of operation key depressed and after an amount has been set up on the amount keys the machine when started (as for instance by depressing the power motor key or turning the crank) will perform a kind-of-operation operation, that is to say, the selector rack 20 will be stopped in its kind-of-operation position L by the kind of operation key depressed. If, on the contrary, after setting up one or more kind-of-operation items in this way the machine is caused to perform a cycle of operation without previous depression of any amount key 15, the kind of operation key will be automatically released and the machine will perform a kind-of-operations total taking operation. A kind-of-operations total taking operation may thus be obtained without the need of any special kind of operation total taking key. In other words, the machine itself "feels" that it should go to the kind-of-operations total taking position, because of the fact that no further amount items are introduced, and so the machine automatically proceeds with the total taking operation required.

If, following the depression of the kind of operation key 1, the machine is started to perform a cycle of operation after a single kind-ofoperation item or no kind-of-operation item at all has been set up by means of the amount keys 15, the machine will, of course, effect a kind-of-operations total taking operation showing as total the single (kind-of-operation) item set up or nil, as the case may be. This, of course, cannot be said to be any inconvenience, since the result is quite correct and proves that the kind-of-operations totalizer is empty.

Towards the end of the cycle of operation of the machine the locking bars 14 are released and restored by the action of their springs 18 in well-known way. This being completed, a resetting of rail 8, if necessary, is effected by means of cam 11 during the continued rotation thereof.

In the course of each cycle of operation of the machine, or, as a result of a depression of the manual correcting key 34, the machine effects a correcting operation, that is to say, a resetting of the amount bars 38 (and 14) because of the rotation of shaft 31 and the consequent circular movement of shaft 29 resulting in a raising of those bars 38 which have been depressed owing to the depression of keys 15 of the respective amount key banks. Let it be assumed that the kind of operation key 1 be not depressed, then also the bars 39, 40 of the clerks' and transaction banks, respectively, are restored as a result of said movement. Though said bars are shorter than bars 38 and, therefore, cannot be directly engaged by the shaft 29 during its circular movement, the cam 41 is in such an angular position as to engage the lower ends of the bars 39, 40 during the circular movement of shaft 29, thereby raising said bars and restoring them to their normal positions. As long as the kind of operation key 1 is not depressed, all of the bars 38—40 will, thus, be automatically restored by means of the power controlled correcting lever 37 in the course of each cycle of operation of the machine or by depressing the key 34.

If, on the contrary, the kind of operation key 1 be depressed to set the machine for performing a kind-of-operation operation, the pin 23 of key 1 depresses the bar 25, Fig. 2, thereby causing its pin 26 to turn the arm 28. As a result, shaft 29 is rotated about its own axis in its bearings in the arms 30 and this in its turn moves cam 41 out of engagement with bars 39, 40. It is thus seen that as soon as, owing to the movement of lever 37 in the operation of the machine or on account of the depression of key 34, shaft 31 is rotated and, as a result, causes shaft 29 to perform its circular movement, the cam 41 will not come into engagement with bars 39, 40 which are thus not restored. This means that when the kind of operation key is in its depressed position only the amount bars 38 are restored, that is to say, the amount keys are released and restored to normal, while the clerks' and transaction bars 39, 40 will remain untouched and the depressed clerks, and transaction key or keys remain depressed. During the kind-of-operation operation all items set up on the respective clerks' and/or transaction totalizer will be registered without requiring depression of the respective clerks' and/or transaction key more than one time, namely at the introduction of the first item. When, afterwards a kind-of-operation total is taken, the kind of operation key will be released, for instance, in the manner above stated, causing the bar 25 to return to its uppermost position and returning the cam 41. Thus, in the operation of the machine for effecting a kind-of-operation total taking also bars 39 and 40 will be restored.

As shown in Fig. 3, the locking bars 14 belonging to the amount key banks cannot move downwards as long as the projections 42 of rail 44 are situated right below the projections 19. In other words, in the normal position of the machine the amount keys cannot be depressed but remain locked against movement. Said locking state can only be overcome by depressing a clerk's and/or a transaction key 49. This is due to the fact that the depression of such a key 49 will raise bar 46 so that its projection 50 releases projection 51 of rail 43 allowing spring 52 to displace the composite rail 43, 44 to the right in Fig. 3 so as to remove the projections 42 from the path of the bars 14. It is now possible to set up amounts in the machine.

Since the amount keys, as above stated, are normally locked against movement and cannot be depressed until after a clerk's key (or, if desired, another similar key) is depressed, it is impossible for one to depress an amount key or keys in advance, either in a fraudulent manipulation or due to a careless operation. In well-known cash registers such a depression of amount keys in advance may cause trouble, inasmuch as, when afterwards a clerk depresses his special key and sets up an amount, this amount may become distorted by one or more of the amount keys depressed in advance. Thus, by the locking of the amount keys above described the clerk obtains a guarantee that the machine will print exactly the amount set up by the clerk himself and nothing but this amount.

At the end of the cycle of operation of the machine, after the bars 14, 46 have been restored to their normal position in any appropriate or well-known way, the arm 54 will engage pin 53 and move it to the left in Fig. 3. This will allow the projection 51 to again engage the left hand side of the projection 50, thereby again locking the rail member 43 in its normal position shown in Fig. 3. Rail member 44 is caused to take part of this movement to the left by the action of spring 45. This operation may take place either immediately or only after the bars 14 are restored to their uppermost (or normal) positions. If rail member 43 should be restored before the bars 14 have reached their uppermost positions, then the spring 45 would be stretched and allowed to restore rail member 44 to the left, as soon as the locking bars 14 are raised to their uppermost position and release rail member 44.

Towards the end of the cycle of operation of the machine the keys 49 depressed are released in any appropriate or well-known manner and allowed to return to their normal positions. The bar 46 is now restored to its lowermost (or normal) position by the action of its spring 56.

It is to be noted that certain modifications of the construction above described and shown in the drawings may be made without departing from the principle of the invention.

Thus, for instance, the release of the kind of operation key, as illustrated in Fig. 1, may, if desired, be rendered dependent not only on the amount keys 15 but also on other keys, as for instance, the clerks' and/or transaction keys or exclusively by one or more such other keys. Generally, it is preferred to let the release of the kind of operation key depend on the condition only, whether there is any amount key 15 depressed or not. When—as shown in Fig. 2—the kind of operation key determines whether bars of the clerks' and/or transaction key banks should be corrected (or restored) or not in the course of a cycle of the machine, the release of the kind of opeartion key cannot, of course, be made dependent on the clerks' and/or transaction keys.

On the other hand, the cam 41 may, of course, be made dependent on one bar 39, 40 only. This may be of importance, for instance, in case of bonding machines, inasmuch as in such machines it is often desired in performing a multiple items operation to let the clerk's key only remain locked in its depressed position during the entire multiple items operation, whereas the transaction key (or, more correctly, the kind-of-goods key) is released in each cycle of operation of the machine at the same time that the amount keys are released. In performing a multiple items operation, the clerk may specify different multiple items in respect to different kinds of goods in order finally to get a multiple items total as a result of the total taking operation. It may also be possible to provide a plurality of cams similar to 41 in order to control more key locking bars and, if desired, make the shaft 29 settable to various positions by rotating same. It is thus possible to render one or more bars (similar to 39, 40) released or locked in any desired combinations in the operation of the machine (and on the depression of key 34) that is to say, to render various groups of keys dependent on each other, so that a key of a given group cannot be depressed until after a key (or keys) of a preceding group (or groups) of keys has been depressed.

Similarly, two or more key banks may be made dependent on each other by means of the construction shown in Fig. 3. This will permit an interlocking of the acts of depression of keys of various banks in such a way that the acts of depression must be effected in a predetermined sequence as far as the various banks are concerned. By this means certain sources of wrong and false manipulations may be removed.

What I claim is:

1. In a cash register, accounting machine or other machine of the class specified, the combination with a kind of operation key and banks of amount keys, of means to retain said kind of operation key in depressed position, means adapted to release said retaining means in the course of a cycle of operation of the machine, means to suppress said releasing action in the depressed state of any amount key but allow it to take place in the normal position of all amount keys, and means to determine the kind of operation of the machine in dependence on the kind of operation key being held depressed or released in the course of the respective cycle of operation of the machine.

2. In a cash register, accounting machine or other machine of the class specified, the combination with a kind of operation key and banks of amount keys, of a swingable element to retain the kind of operation key in depressed position, a slidable rail for releasing said retaining element, means for effecting the releasing action of said rail, locking bars operable by the amount keys for locking the rail against performance of its releasing action in the depressed state of any amount key.

3. In a cash register, accounting machine or other machine of the class specified, the combination with a kind of operation key and banks of amount keys, of means to retain the kind of operation key in depressed position, a cyclically operable power-driven shaft, a slidable rail for releasing said retaining means under the combined control of a spring and a cam on said shaft, and means under the control of the amount keys for locking said rail against operation under the said combined control in the depressed state of any amount key.

4. In a cash register, accounting machine or other machine of the class specified, the combination with a kind-of-operation key and amount keys, of means to determine the kind-of-operation of the machine in dependency of the kind-of-operation key being held depressed or released after depression in the course of the respective cycle of operation of the machine, means for retaining the kind-of-operation key in depressed position, means for releasing said retaining means in the normal state of all of said amount keys but leaving it unreleased in the depressed state of any amount key, power driven means for restoring the amount keys to normal position in the course of operation of the machine, and means operable by the kind-of-operation key for setting said restoring means to different positions for restoring said amount keys to normal in dependency of the depressed or normal, non-depressed state of the kind-of-operation key.

5. In a cash register, accounting machine or other machine of the class specified, the combination with a kind-of-operation key and amount keys, of means to determine the kind-of-operation of the machine in dependency of the kind-of-operation key being held depressed or released after depression in the course of the respective cycle of operation of the machine, means to retain the kind-of-operation key in depressed position, means to release said retaining means in the normal state of all of said amount keys but leaving it unreleased in the depressed state of any amount key, manually controlled means for restoring the amount keys to normal position in the course of operation of the machine, and means operable by the kind-of-operation key for setting said restoring means to different positions for restoring said amount keys to normal in dependency of the depressed or normal, non-depressed state of the kind-of-operation key.

6. In a cash register, accounting machine or other machine of the class specified, the combination with a kind-of-operation key, amount keys and other keys, of means to determine the kind-of-operation of the machine in dependency of the kind-of-operation key being held depressed or released after depression in the course of the respective cycle of operation of the machine, means to retain the kind-of-operation key in depressed position, means to release said retaining means in the normal state of all of said amount keys but leaving it unreleased in the depressed state of any amount key, a shaft swingable about a fixed fulcrum for restoring the amount keys, a cam or cams on said shaft for restoring said other keys, means under the control of the kind-of-operation key for setting said cam or cams into and out of operative position with relation to said other keys, and means for swinging said shaft in the course of operation of the machine.

7. In a cash register, accounting machine or other machine of the class specified, the combination with a kind-of-operation key, amount keys and special keys, of means to retain the kind-of-operation key in depressed position, means to release said retaining means in the normal state of all of said amount keys but allowing the retaining means to remain in operative position in the depressed state of any amount key, means to determine the kind-of-operation of the machine in dependency of the kind-of-operation key being held depressed or released after depression in the course of operation of the machine, locking bars operable by said amount keys for individually preventing the operation of said releasing means in the depressed state of the respective keys, means releasable by said special keys for preventing the depression of any amount key in the normal state of the machine, a shaft rotatable about its own axis and swingable about another axis parallel thereto for restoring said amount to normal, a cam or cams on said shaft for restoring said special keys to normal, means under the control of the kind-of-operation key for rotating said shaft about its own axis to bring the cam or cams into and out of operative relation with said special keys, and means for swinging said shaft in the course of operation of the machine.

8. In a machine of the class specified, the combination of a selecting element for determining the multiple item operation and the multiple item total taking operation of the machine, a manually operable multiple item key for stopping said element in the multiple item position when depressed and allowing it to pass to multiple item total taking position in the normal position of the multiple item key, a fixed member to determine the multiple item total taking position of said selecting element, amount keys, a prime mover, a member movable by said prime mover in the normal position of the amount keys for releasing the depressed multiple item key and causing it to allow the selecting element to pass to the multiple item total taking operation, and means to engage said member and hold it against movement necessary to release the depressed multiple item key in the depressed state of any amount key in order to retain the multiple item key in depressed state and allow it to stop the selecting member in the multiple item position.

9. In a machine of the class specified, the combination of a manually operable kind of operation key, an element for maintaining said key in depressed position, a sliding member for operating said element to release the kind of operation key, a power driven cam for controlling said sliding member, banks of amount keys, bars controlled by said keys for locking said sliding member against operation, a power driven member for selecting the kind of operation of the machine, by being movable into two different positions, means independent of the kind of operation key for stopping the selecting member in one of said positions, and means on said selecting member for engaging the kind of operation key when in depressed state to stop the selecting member in the other position.

STURE EDVARD WERNER.

REFERENCES CITED

The following references are of record in the file of this patent:

UNITED STATES PATENTS

| Number | Name | Date |
| --- | --- | --- |
| 1,050,039 | Peters | Jan. 7, 1913 |
| 1,965,611 | Sundstrand | July 10, 1934 |
| 2,056,821 | Breitling | Oct. 6, 1936 |
| 2,075,635 | Breitling et al. | Mar. 30, 1937 |
| 2,088,434 | Racz | July 27, 1937 |
| 2,108,896 | Lehmann et al. | Feb. 22, 1938 |
| 2,210,065 | Colley et al. | Aug. 6, 1940 |